United States Patent
Zha et al.

(10) Patent No.: US 10,273,397 B2
(45) Date of Patent: Apr. 30, 2019

(54) SYNTHETIC CROSSLINKED POLYMER ADDITIVE FOR USE IN SUBTERRANEAN TREATMENT FLUIDS

(71) Applicant: Halliburton Energy Services, Inc., Houston, TX (US)

(72) Inventors: Weibin Zha, The Woodlands, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/507,826

(22) PCT Filed: Oct. 1, 2014

(86) PCT No.: PCT/US2014/058582
§ 371 (c)(1),
(2) Date: Mar. 1, 2017

(87) PCT Pub. No.: WO2016/053329
PCT Pub. Date: Apr. 7, 2016

(65) Prior Publication Data
US 2017/0306209 A1    Oct. 26, 2017

(51) Int. Cl.
*C09K 8/88*    (2006.01)
*C09K 8/12*    (2006.01)
(Continued)

(52) U.S. Cl.
CPC ............... *C09K 8/12* (2013.01); *C09K 8/512* (2013.01); *C09K 8/528* (2013.01); *C09K 8/685* (2013.01); *C09K 8/88* (2013.01); *C09K 8/887* (2013.01)

(58) Field of Classification Search
None
See application file for complete search history.

(56) References Cited

U.S. PATENT DOCUMENTS 3,764,530 A * 10/1973 Burland ............... C09K 8/24
                                              507/119
4,678,591 A    7/1987 Giddings et al.
(Continued)

OTHER PUBLICATIONS

International Search Report and Written Opinion issued in related PCT Application No. PCT/US2014/058582 dated Jun. 22, 2015, 13 pages.

(Continued)

*Primary Examiner* — Andrew Sue-Ako
(74) *Attorney, Agent, or Firm* — Tenley Krueger; Baker Botts L.L.P.

(57) ABSTRACT

Crosslinked polymer additives that may be used as thinners and/or deflocculants in subterranean treatment fluids are provided. In one embodiment, the methods comprise: providing a treatment fluid comprising an aqueous base fluid, a viscosifying agent, and a crosslinked synthetic polymer that comprises a copolymer of at least a first monomer comprising 2-acrylamido-2-methylpropane sulfonic acid or any salt thereof, and a second monomer comprising an N-vinyl amide, and at least one crosslinking agent, wherein the average molecular weight of the crosslinked synthetic polymer is less than about 3,000,000 grams per mole; and introducing the treatment fluid into at least a portion of a well bore penetrating at least a portion of a subterranean formation.

19 Claims, 1 Drawing Sheet

(51) Int. Cl.
*C09K 8/512* (2006.01)
*C09K 8/528* (2006.01)
*C09K 8/68* (2006.01)

(56) References Cited

U.S. PATENT DOCUMENTS

| | | | |
|---|---|---|---|
| 4,814,096 A * | 3/1989 | Evani | C08L 33/26 166/270.1 |
| 5,032,296 A * | 7/1991 | Patel | C09K 8/24 507/107 |
| 5,620,947 A | 4/1997 | Elward-Berry | |
| 5,789,349 A | 8/1998 | Patel | |
| 5,883,210 A | 3/1999 | Ahmed et al. | |
| 6,395,853 B1 | 5/2002 | Oswald et al. | |
| 6,437,068 B2 | 8/2002 | Loffler et al. | |
| 6,465,397 B1 | 10/2002 | Patterson | |
| 6,590,050 B1 | 7/2003 | Bair et al. | |
| 6,683,144 B2 | 1/2004 | Loffler et al. | |
| 6,891,009 B2 | 5/2005 | Loffler et al. | |
| 7,098,171 B2 | 8/2006 | Thaemlitz | |
| 7,208,556 B2 | 4/2007 | Loffler et al. | |
| 9,410,069 B2 | 8/2016 | Zha et al. | |
| 2007/0179064 A1 | 8/2007 | Jarrett et al. | |
| 2012/0077718 A1 | 3/2012 | Yang et al. | |
| 2012/0138299 A1 | 6/2012 | Joseph et al. | |

OTHER PUBLICATIONS

International Preliminary Report on Patentability issued in related Application No. PCT/US2014/058582, dated Apr. 13, 2017 (10 pages).

* cited by examiner

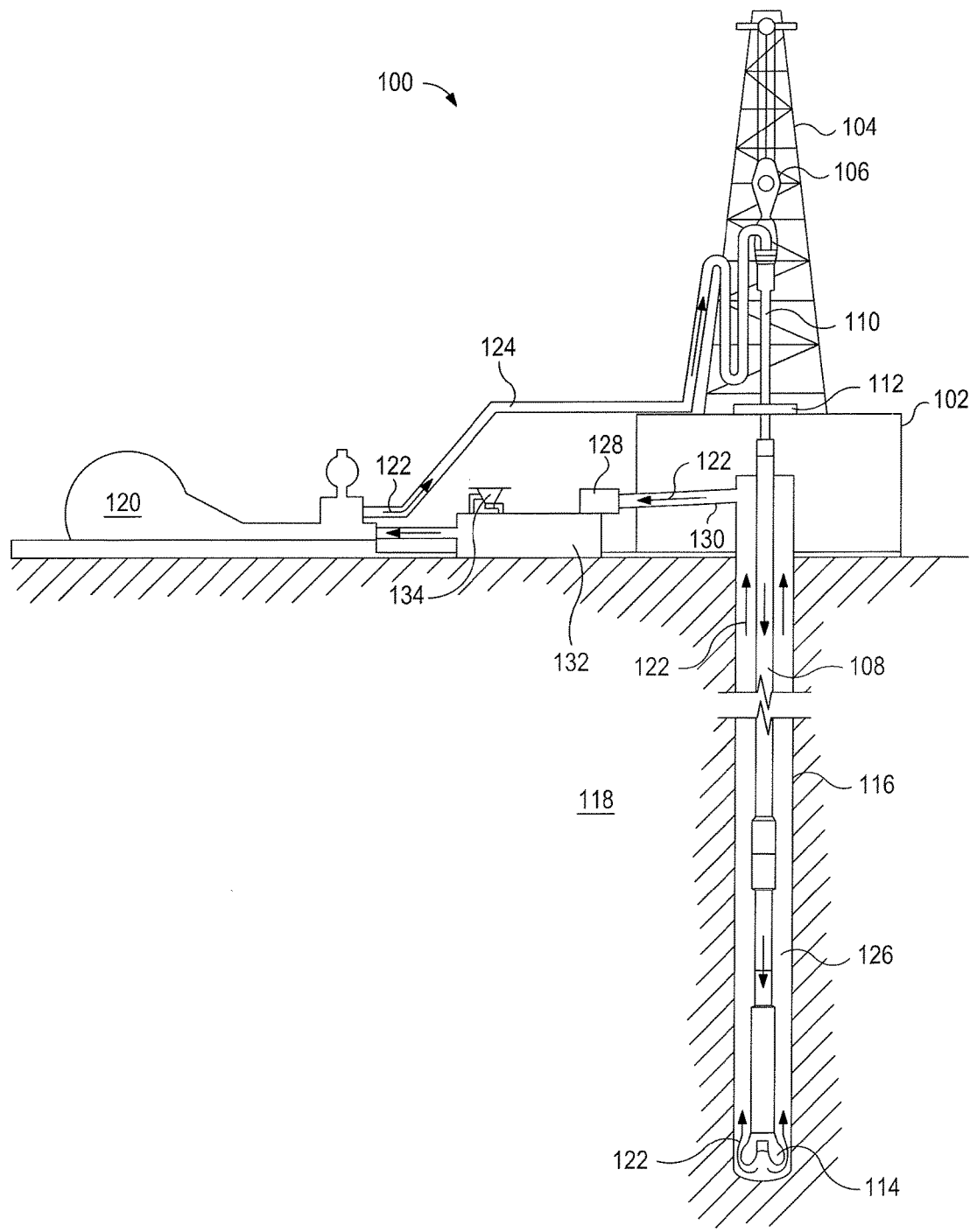

SYNTHETIC CROSSLINKED POLYMER ADDITIVE FOR USE IN SUBTERRANEAN TREATMENT FLUIDS

CROSS-REFERENCE TO RELATED APPLICATION

The present application is a U.S. National Stage Application of International Application No. PCT/US2014/058582 filed Oct. 1, 2014, which is incorporated herein by reference in its entirety for all purposes.

BACKGROUND

The present disclosure relates to synthetic crosslinked polymer additives that may be used as thinners and/or deflocculants in subterranean treatment fluids, and associated methods of use in subterranean treatments.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

For example, a drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

Maintaining sufficient viscosity in the treatment fluids used in these operations is important for a number of reasons. In particular, maintaining sufficient viscosity may be important in drilling operations to control and/or reduce fluid loss into the formation. "Fluid loss," as that term is used herein, refers to the undesirable migration, leak off, or other loss of fluids (e.g., a drilling fluid) into a subterranean formation and/or a proppant pack. In some instances, certain synthetic polymers (i.e., typically linear or lightly crosslinked with less than about 1 mol % crosslinker) have been added to water-based drilling fluids to control fluid loss. However, the use of these polymers often requires the use of clays that, in some instances, can plug formation pores and cause damage in the formation. In other instances, the amounts of these polymers needed to provide the desired level of fluid loss control may be so high that it increases the viscosity of the fluid above the desired levels.

BRIEF DESCRIPTION OF THE FIGURES

These drawings illustrate certain aspects of some of the embodiments of the present disclosure, and should not be used to limit or define the disclosure.

FIG. 1 is a diagram illustrating an example of a well bore drilling assembly that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to synthetic crosslinked polymer additives that may be used as thinners and/or deflocculants in subterranean treatment fluids, and associated methods of use in subterranean treatments.

More specifically, the present disclosure provides crosslinked polymer additives comprising certain copolymers of at least one monomer comprising 2-acrylamido-2-methylpropane sulfonic acid (AMPS) or a salt thereof and at least one N-vinyl amide monomer crosslinked with one or more crosslinking agents. Unlike conventional synthetic copolymers of this type, a chain transfer agent is used in synthesizing the crosslinked polymer additives of the present disclosure. This chain transfer agent may, among other things, provide for a synthetic polymer having an average molecular weight (e.g., number-average molecular weight, weight-average molecular weight, etc.) that is lower than polymers synthesized using other methods.

The additives, treatment fluids, and/or methods of the present disclosure may exhibit and/or provide, among other benefits and properties, improved rheological properties (e.g., suitable levels of viscosity, yield point, etc.), solids suspension, and/or fluid loss control under wellbore conditions (e.g., temperatures of up to about 400° F.) for extended periods of time. For example, a treatment fluid of the present disclosure may be capable of maintaining desired viscosity and fluid-loss control at temperatures of about 400° F. for about 16 hours. When used in an aqueous-based treatment fluid comprising a polymeric viscosifying agent, the crosslinked polymer additives of the present disclosure may reduce the viscosity of the fluid while still providing fluid loss control. In certain embodiments, the methods, treatment fluids, and additives of the present disclosure may provide such benefits and/or rheological properties without the need for clay-based fluid additives in the fluid. For example, in certain embodiments, the treatment fluids of the present disclosure may comprise less than about 2% by weight of clay-based additives. However, in other embodiments, the treatment fluids and/or additives of the present disclosure may enhance the rheological properties in which clay-based additives are included, for example, as a viscosifying agent.

In certain embodiments, treatment fluids of the present disclosure may exhibit plastic viscosities (at 120° F.) of less than about 100 cP, less than about 50 cP, less than about 40 cP, or less than about 30 cP. In certain embodiments, treatment fluids of the present disclosure may exhibit 10 s gel strengths of less than about 30 lb/100 ft$^2$ and/or 10 min gel strengths of less than about 40 lb/100 ft². In certain embodiments, treatment fluids of the present disclosure may exhibit yield points of less than about 45 lb/100 ft².

The crosslinked polymer additives of the present disclosure generally comprise copolymers that comprise at least one AMPS monomer (or any salt thereof) and at least one N-vinyl amide monomer. Salts of AMPS monomers that may be used in certain embodiments of the present disclosure may include, for example, ammonium or sodium salts of 2-acrylamido-2-methylpropane sulfonic acid. Examples of N-vinyl amide monomers that may be suitable in certain embodiments of the present disclosure include, but are not limited to, N-vinylpyrrolidone (NVP), N-vinylcaprolactam, N-vinylformamide, N-vinyl-N-methylacetamide, and any combinations thereof. In certain embodiments, these copolymers may comprise alternating copolymers, block copolymers, random copolymers, or any variation or combination thereof, and may be linear or branched. The crosslinked polymer additives of the present disclosure may be crosslinked using any crosslinking agent known in the art. In certain embodiments, the crosslinking agent may comprise a compound or molecule having at least two olefinic double bonds. Examples of crosslinking agents that may be suitable in certain embodiments include, but are not limited to, methylenebisacrylamide (MBAM), vinyl or allyl ethers of glycols or polyols (e.g., pentaerythritol allyl ether (PAE)), and any combinations thereof.

In certain embodiments, the crosslinked synthetic polymers used in the additives of the present disclosure generally comprise an ethylene repeating unit including an $-NR^a-C(O)-R^b$ group, wherein at each occurrence $R^a$ and $R^b$ are each independently selected from $-H$ and substituted or unsubstituted $(C_1-C_{20})$ hydrocarbyl or $R^a$ and $R^b$ together form a substituted or unsubstituted $(C_2-C_{20})$ hydrocarbylene. The crosslinked synthetic polymers also generally comprise an ethylene repeating unit including an $-S(O)_2OR^1$ group wherein at each occurrence $R^1$ is independently selected from the group consisting of $-H$ and a counterion. Certain of these embodiments of crosslinked polymers additives of the present disclosure may comprise repeating units having a structure according to Structure I below:

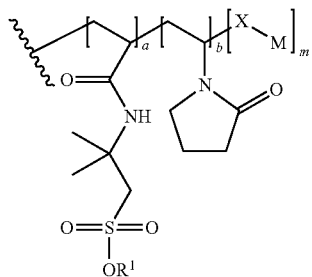

(I)

The repeating units may be in a block, alternate, or random configuration, and each repeating unit may be independently in the orientation shown or in the opposite orientation. At each occurrence, $R^1$ may be independently selected from the group consisting of $-H$ and a counterion. At each occurrence, X may independently be one or more crosslinking agents (either the same or different crosslinking agents throughout. At each occurrence, M may be independently an ethylene repeating unit of the same polymer molecule or an ethylene repeating unit of another molecule of the polymer. In certain embodiments, the crosslinked synthetic polymer comprises about 50 mol % to about 98 mol % of the repeating unit including the $-S(O)_2OR^1$ and about 1 mol % to about 40 mol % of the repeating unit including the 2-pyrrolidon-1-yl group. In Structure I above, each of a, b, and m may represent any non-zero integer.

For example, in certain embodiments, the crosslinked synthetic polymers of Structure I above may include an X-M group that comprises an ethylene repeating unit at each occurrence independently linked to an ethylene repeating unit in the same polymer molecule or in another molecule of the polymer via a $-C(O)-NH-$ (substituted or unsubstituted $(C_1-C_{20})$ hydrocarbylene)-NH-C(O)- group. In certain embodiments, the crosslinked synthetic polymers of Structure I above may include an X-M group that comprises an ethylene repeating unit bonded to an $-R^2-O-R^2-C(-R^2-OR^3)_3$ group, wherein at each occurrence $R^2$ is independently substituted or unsubstituted $(C_1-C_{10})$ hydrocarbylene and at each occurrence $R^3$ is independently selected from the group consisting of $-H$ and -(substituted or unsubstituted $(C_1-C_{10})$ hydrocarbylene)-M wherein at each occurrence M is independently an ethylene repeating unit of the same polymer molecule or an ethylene repeating unit of another molecule of the polymer. Certain of these embodiments of crosslinked polymers additives of the present disclosure may comprise repeating units having a structure according to Structure II below:

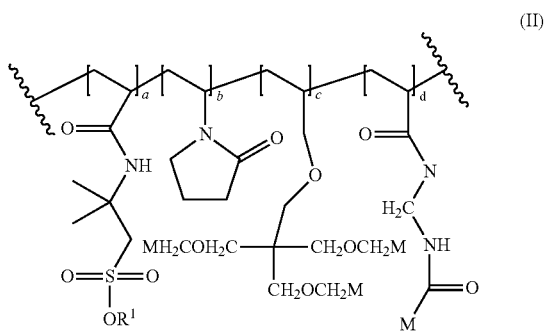

(II)

The repeating units may be in a block, alternate, or random configuration, and each repeating unit may be independently in the orientation shown or in the opposite orientation. At each occurrence $R^1$ may be independently selected from the group consisting of $-H$ and a counterion. At each occurrence M may be independently an ethylene repeating unit of the same polymer molecule or an ethylene repeating unit of another molecule of the polymer. In certain embodiments, the crosslinked synthetic polymer comprises about 50 mol % to about 98 mol % of the repeating unit including the $-S(O)_2OR^1$, about 1 mol % to about 40 mol % of the repeating unit including the 2-pyrrolidon-1-yl group, and about 0.1 mol % to about 15 mol % of the repeating unit including the $-CH_2-O-CH_2-C(-CH_2-OCH_2M)_3$ group. In Structure II above, each of a and b may represent any non-zero integer, and each of c and d may represent any integer, including 0.

The chain transfer agents used in synthesizing the crosslinked polymer additives of the present disclosure may comprise any chain transfer agent known in the art. Chain transfer agents typically have at least one weak chemical bond, which may facilitate chain transfer reactions during polymerization. Examples of chain transfer agents that may be suitable in certain embodiments of the present disclosure include, but are not limited to, thiols (e.g., butanethiol), halocarbons (e.g., carbon tetrachloride), disulfides (e.g., dialkyl, diaryl, diaroyl), thiurams, xanthogens, and any combination thereof. In certain embodiments, the use of the chain transfer agent in the synthesis process may, among other effects, produce a polymer having a lower molecular weight than similar polymers synthesized without a chain transfer agent. In the synthesis process, the chain transfer agent may be used in any amount that yields a crosslinked polymer additive of the desired molecular weight. In certain embodiments, the chain transfer agent may be used in an amount of from about 0.01% to about 1% by weight of the combined AMPS and N-vinyl amide monomers used to synthesize the crosslinked polymer. In certain embodiments, the chain transfer agent may be used in an amount of about 0.4% by weight of the combined AMPS and N-vinyl amide monomers used to synthesize the crosslinked polymer.

The crosslinked polymer additives of the present disclosure may be prepared and/or formed using any polymerization methods known in the art. For example, the crosslinked polymer additives may be prepared by combining their constituent monomers and crosslinking agents in a solution along with a chain transfer agent. The polymerization reactions may be facilitated by varying conditions in the solution (e.g., temperature, pressure, etc.), applying energy in one or more forms to the solution, and/or by the addition of one or more radical initiators, oxidizers, enzymes, and/or catalysts.

The crosslinked polymer additives of the present disclosure can have any suitable molecular weight, but generally has an average molecular weight of at least about 500,000 g/mol. However, in certain embodiments, the average molecular weight of a crosslinked polymer additive of the present disclosure may be lower than the molecular weight of a polymeric viscosifier in the treatment fluid in which the additive is used. For example, in certain embodiments, the average molecular weight of a crosslinked polymer additive of the present disclosure may be less than about 3,000,000 g/mol, or between about 500,000 g/mol and about 3,000,000 g/mol. In certain embodiments, the average molecular weight of a crosslinked polymer additive of the present disclosure may be less than about 2,000,000 g/mol, or between about 500,000 g/mol and about 2,000,000 g/mol. In certain embodiments, the average molecular weight of a crosslinked polymer additive of the present disclosure may be less than about 1,800,000 g/mol, or between about 500,000 g/mol and about 1,800,000 g/mol.

The average molecular weight of the crosslinked polymer additive (i.e., either the absolute molecular weight or the relative molecular weight as compared to a polymeric viscosifying agent in the fluid) may be measured and/or determined using one or more known methods and/or apparatus for measuring molecular mass and/or weight, including but not limited to a light scattering measurement method using a Multi-Angle Static Light Scattering (MALS) Detector (e.g., a Wyatt Dawn® Heleos® II detector, available from Wyatt Technology Corporation of Santa Barbara, Calif.). In one embodiment, such an apparatus may be used to measure the molecular weight of crosslinked polymer additive of the present disclosure in batch mode, based on samples prepared in multiple different concentrations of the crosslinked polymer in a solvent (e.g., 0.2M sodium nitrate).

In certain embodiments, the methods of the present disclosure generally comprise providing (e.g., forming) a treatment fluid comprising an aqueous base fluid and a crosslinked synthetic polymer additive of the present disclosure, and introducing the treatment fluid into at least a portion of a well bore penetrating a portion of a subterranean formation. The crosslinked synthetic polymer additive of the present disclosure may be included in the treatment fluid in any amount that provides the desired level of fluid loss control, viscosity, and/or other rheological properties. In certain embodiments, the crosslinked synthetic polymer additive of the present disclosure may be included in a treatment fluid in an amount of from about 0.1 pounds per barrel (lbs/bbl) to about 10 pounds per barrel by volume of the treatment fluid. In certain embodiments, the crosslinked synthetic polymer additive of the present disclosure may be included in a treatment fluid in an amount of as little as any of 0.1, 0.5, 1, 1.5, 2, 2.5, 3, 3.5, 4, 4.5, or 5 lbs/bbl. In certain embodiments, the crosslinked synthetic polymer additive of the present disclosure may be included in a treatment fluid in an amount of as much as any of 4, 4.5, 5. 5.5, 6, 6.5, 7, 7.5, 8, 8.5, 9, 9.5, or 10 lbs/bbl. Thus, for example, in certain embodiments, the crosslinked synthetic polymer additive may be included in a treatment fluid in a concentration of from about 2 lbs/bbl to about 5 lbs/bbl; in other embodiments, from about 2.5 lbs/bbl to about 8 lbs/bbl; in other embodiments from about 3 lbs/bbl to about 6 lbs/bbl; and so on. A person of skill in the art with the benefit of this disclosure will recognize the appropriate amount of the synthetic polymer additive of the present disclosure to include in a treatment fluid based on, among other things, the density of the fluid, the conditions (e.g., temperature) where the treatment fluid is to be used, the amount of viscosifying agents in the fluid, as well as other factors.

The treatment fluids of the present disclosure may comprise any aqueous base fluid or combination thereof known in the art. Aqueous fluids that may be suitable for use in the methods and fluids of the present disclosure may comprise water from any source, provided that it does not contain compounds that adversely affect other components of the fracturing fluid. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents and/or other additives included in the fluid. One of ordinary skill in the art, with the benefit of this disclosure, will recognize when such density and/or pH adjustments are appropriate.

In certain embodiments, the treatment fluids of the present disclosure may comprise one or more viscosifying agents, which may comprise any substance that is capable of increasing the viscosity of a fluid, for example, by forming a gel. In certain embodiments, the viscosifying agent may viscosify an aqueous fluid when it is hydrated and present at a sufficient concentration. In certain embodiments, such viscosifying agents may comprise one or more polymers, including natural and/or synthetic polymers. In certain embodiments, such polymeric viscosifying agents may be linear or may be crosslinked with one or more crosslinking agents. Examples of viscosifying agents that may be suitable for use in accordance with the present disclosure include, but are not limited to guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, etc.), starches, chitosans, clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

In certain embodiments, the viscosifying agent may comprise one or more linear and/or crosslinked copolymers of 2-acrylamido-2-methylpropane sulfonic acid (AMPS) and an N-vinyl amide. In certain embodiments, such a viscosifying agent may comprise copolymers having a higher average molecular weight than the synthetic crosslinked polymer additives of the present disclosure.

The viscosifying agent may be included in any concentration sufficient to impart the desired viscosity and/or suspension properties to the aqueous fluid. In certain embodiments, the viscosifying agent may be included in an amount of from about 0.1 lbs/bbl to about 10 lbs/bbl by volume of the treatment fluid. In certain embodiments, the viscosifying agent may be included in a treatment fluid in an amount of as little as any of 0.1, 0.5, 1, 1.5, 2, 2.5, 3, 3.5, 4, 4.5, or 5 lbs/bbl. In certain embodiments, the viscosifying agent may be included in a treatment fluid in an amount of as much as any of 4, 4.5, 5. 5.5, 6, 6.5, 7, 7.5, 8, 8.5, 9, 9.5, or 10 lbs/bbl. Thus, for example, in certain embodiments, the viscosifying agent may be included in a treatment fluid in a concentration of from about 2 lbs/bbl to about 5 lbs/bbl; in other embodiments, from about 2.5 lbs/bbl to about 8 lbs/bbl; in other embodiments from about 3 lbs/bbl to about 6 lbs/bbl; and so on.

In certain embodiments, the treatment fluids of the present disclosure optionally may comprise any number of additional additives, among other reasons, to enhance and/or impart additional properties of the composition. For example, the compositions of the present disclosure optionally may comprise one or more salts, among other reasons, to act as a clay stabilizer and/or enhance the density of the composition, which may facilitate its incorporation into a treatment fluid. In certain embodiments, the treatment fluids of the present disclosure optionally may comprise one or more dispersants, among other reasons, to prevent flocculation and/or agglomeration of the solids while suspended in a slurry. Other examples of such additional additives include, but are not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The treatment fluids of the present disclosure may be prepared by any suitable means known in the art. In some embodiments, the treatment fluids may be prepared at a well site or at an offsite location. In certain embodiments, a base fluid may be mixed with a viscosifying agent and/or a crosslinked synthetic polymer additive of the present disclosure first, among other reasons, in order to allow the polymer to hydrate. Certain components of the fluid may be provided as a dry mix to be combined with fluid or other components prior to or during introducing the fluid into the well. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the on-going treatment.

The methods, treatment fluids, and additives of the present disclosure may be used during or in conjunction with any operation in a portion of a subterranean formation and/or wellbore, including but not limited to drilling operations, pre-flush treatments, after-flush treatments, hydraulic fracturing treatments, sand control treatments (e.g., gravel packing), "frac-pack" treatments, acidizing treatments (e.g., matrix acidizing or fracture acidizing), well bore clean-out treatments, cementing operations, workover treatments/fluids, and other operations where a treatment fluid may be useful. Thus, the treatment fluids of the present disclosure may comprise any type of subterranean treatment fluid known in the art, including but not limited to drilling fluids, pre-flush fluids, after-flush fluids, fracturing fluids, packer fluids, gravel packing fluids, acidizing fluids, cementing fluids, clean-out fluids, workover fluids, completion fluids, and the like. For example, the methods, treatment fluids, and/or additives of the present disclosure may be used in the course of drilling operations in which a well bore is drilled to penetrate a subterranean formation. In certain embodiments, this may be accomplished using the pumping system and equipment used to circulate the drilling fluid in the well bore during the drilling operation, which is described below. In these embodiments, the treatment fluids and/or additives of the present disclosure may be used as or in a "drilling mud" that is circulated in the well bore during at least a portion of the drilling operations.

The treatment fluids and/or additives of the present disclosure may be provided and/or introduced into the well bore or used to drill at least a portion of a well bore in a subterranean formation using any method or equipment known in the art. In certain embodiments, a treatment fluid of the present disclosure may be circulated in the well bore using the same types of pumping systems and equipment at the surface that are used to introduce drilling fluids and/or other treatment fluids or additives into a well bore penetrating at least a portion of the subterranean formation.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods, treatment fluids, and/or additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed treatment fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed methods, treatment fluids, and/or additives may directly or indirectly affect the pump 120, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like. The disclosed fluids and additives may also directly or indirectly affect the mixing hopper 134 and the retention pit 132 and their assorted variations.

The disclosed methods, treatment fluids, and/or additives also may directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed methods, treatment fluids, and/or additives may also directly or indirectly affect any downhole heat exchangers, valves and corresponding actuation devices, tool seals, packers and other wellbore isolation devices or components, and the like associated with the wellbore 116. The disclosed methods, treatment fluids, and/or additives may also directly or indirectly affect the drill bit 114, which may include, but is not limited to, roller cone bits, PDC bits, natural diamond bits, any hole openers, reamers, coring bits, etc.

The disclosed methods, treatment fluids, and/or additives also may directly or indirectly affect the various equipment and/or tools (not shown) used at a well site or in drilling assembly 100 to detect various events, properties, and/or phenomena. Such equipment and/or tools may include, but are not limited to, pressure gauges, flow meters, sensors (e.g., float sensors used to monitor the level of drilling fluid in retention pit 132, downhole sensors, sensors in return flow line 130, etc.), seismic monitoring equipment, logging equipment, and the like.

While not specifically illustrated herein, the disclosed methods, treatment fluids, and/or additives may also directly or indirectly affect any transport or delivery equipment used to convey the compositions to the drilling assembly 100 such as, for example, any transport vessels, conduits, pipelines, trucks, tubulars, and/or pipes used to fluidically move the treatment fluids and/or additives from one location to another, any pumps, compressors, or motors used to drive the compositions into motion, any valves or related joints used to regulate the pressure or flow rate of the treatment fluids, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Polymer Synthesis

In this example, a sample of a synthetic crosslinked polymer additive of the present disclosure was prepared. To a flask was added 21.4 g of 2-acrylamido-2-methylpropane sulfonic acid monomer, in 180 mL of t-butanol. Ammonium hydroxide was added to neutralize the acid while the mixture was heated to 150° F. Then, 2.2 g of N-vinylpyrrolidone (NVP) monomer, 5 mol % of pentaerythritol allyl ether crosslinker, and a butanethiol chain transfer agent in an amount of 0.4% by weight of the AMPS and NVP monomers were added. The mixture was kept at 150° F. for 240 minutes, and was then cooled down to room temperature. The precipitate was filtered and dried.

Polymer Evaluation

The crosslinked polymers synthesized according to the procedure described above were evaluated with a drilling mud formulation as shown in Table 1 (Fluid B). A drilling mud of the same formulation but without the crosslinked polymer synthesized with the chain transfer agent (Fluid A) was also evaluated. The viscosifier comprised a synthetic crosslinked copolymer of AMPS and NVP monomers. It should be understood that the formulation shown in Table 1 is merely one example of many types of fluids that can be made according to the present disclosure.

TABLE 1

| Formulation | Amount (Fluid A) | Amount (Fluid B) |
|---|---|---|
| Water (bbl) | 0.79 | 0.79 |
| Viscosifier (lbs/bbl) | 4 | 4 |
| Crosslinked synthetic polymer (lbs/bbl) | — | 4 |
| Barite (lbs/bbl) | 311 | 311 |
| KCl (lbs/bbl) | 4 | 4 |
| NaHCO$_3$ (lbs/bbl) | 4.0 | 4.0 |
| NaOH (lbs/bbl) | 0.5 | 0.5 |

The drilling muds according to the formulations in Table 1 were hot-rolled at 150° F. for 16 hours, and then statically aged at 400° F. for another 16 hours. Rheology data (i.e., shear stress (SS) at various speeds, gel strengths, plastic viscosity, and yield point) for each fluid before hot-rolling (BHR), after hot-rolling (AHR), and after static aging (ASA) was obtained at 120° F. with a FANN™ Model 35 viscometer. The API fluid loss (through filter paper) for each fluid at high pressure/high temperature conditions of 350° F. and 500 psi differential pressure was measured after hot rolling and after static aging. Table 2 shows the measured rheological and fluid loss properties for each of the fluids.

TABLE 2

| | Fluid A | | | Fluid B | | |
|---|---|---|---|---|---|---|
| | BHR | AHR | ASA | BHR | AHR | ASA |
| SS @ 600 rpm (lb/100 ft$^2$) | 83 | 84 | 117 | 75 | 78 | 83 |
| SS @ 300 rpm (lb/100 ft$^2$) | 66 | 65 | 83 | 54 | 53 | 54 |
| SS @ 200 rpm (lb/100 ft$^2$) | 57 | 56 | 70 | 42 | 42 | 41 |
| SS @ 100 rpm (lb/100 ft$^2$) | 47 | 44 | 54 | 30 | 30 | 28 |
| SS @ 6 rpm (lb/100 ft$^2$) | 29 | 26 | 41 | 13 | 13 | 13 |
| SS @ 3 rpm (lb/100 ft$^2$) | 28 | 25 | 36 | 12 | 12 | 11 |
| 10 s gel (lb/100 ft$^2$) | 36 | 32 | 41 | 15 | 14 | 16 |
| 10 min gel (lb/100 ft$^2$) | 57 | 46 | 60 | 21 | 18 | 23 |
| Plastic viscosity (cP) | 17 | 19 | 34 | 21 | 25 | 29 |
| Yield point (lb/100 ft$^2$) | 49 | 46 | 49 | 33 | 28 | 25 |
| API HPHT fluid loss (mL) | — | 27.2 | 26 | — | 20.8 | 18 |

In this example, the synthetic crosslinked polymer additive of the present disclosure lowered shear stress, 10 sec gel strength, and 10 min gel strength by more than 50%. It also reduced yield point by about 30% after hot rolling and by about 50% after static aging, while also reducing fluid loss. The data in Table 2 demonstrates, among other things, that fluids comprising the synthetic crosslinked polymer additives of the present disclosure may exhibit enhanced fluid loss control yet without undesired increases in viscosity, and may be stable after about 16 hours at temperatures up to about 400° F.

An embodiment of the present disclosure is a method comprising: providing a treatment fluid comprising an aqueous base fluid, a viscosifying agent, and a crosslinked synthetic polymer that comprises a copolymer of at least a first monomer comprising 2-acrylamido-2-methylpropane sulfonic acid or any salt thereof, and a second monomer comprising an N-vinyl amide, and at least one crosslinking agent, wherein the average molecular weight of the crosslinked synthetic polymer is less than about 3,000,000 grams per mole; and introducing the treatment fluid into at least a portion of a well bore penetrating at least a portion of a subterranean formation.

Another embodiment of the present disclosure is a method comprising: providing a treatment fluid comprising an aqueous base fluid, a viscosifying agent, and a crosslinked synthetic polymer that comprises a copolymer of at least a first monomer comprising 2-acrylamido-2-methylpropane sulfonic acid or any salt thereof, and a second monomer comprising an N-vinyl amide, and at least one crosslinking agent, wherein the crosslinked synthetic polymer is synthesized by combining the first and second monomers and the crosslinking agent in the presence of a chain transfer agent; and introducing the treatment fluid into at least a portion of a well bore penetrating at least a portion of a subterranean formation.

Another embodiment of the present disclosure is a method comprising: providing a solution comprising a first monomer comprising 2-acrylamido-2-methylpropane sulfonic acid or any salt thereof, a second monomer comprising an N-vinyl amide, at least one crosslinking agent, and a chain transfer agent; allowing the first and second monomers and the crosslinking agent to polymerize to form a crosslinked synthetic polymer; combining the crosslinked synthetic polymer with an aqueous base fluid and a viscosifying agent to form a treatment fluid; and introducing the treatment fluid into at least a portion of a well bore penetrating at least a portion of a subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. Moreover, the term "about" as used herein can allow for a degree of variability in a value or range, for example, within 10%, within 5%, or within 1% of a stated value or of a stated limit of a range. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising an aqueous base fluid, a viscosifying agent, and a crosslinked synthetic polymer that comprises
      a copolymer of at least a first monomer comprising 2-acrylamido-2-methylpropane sulfonic acid or any salt thereof, and a second monomer comprising an N-vinyl amide, and
      at least one crosslinking agent,
      wherein an average molecular weight of the crosslinked synthetic polymer is less than about 3,000,000 grams per mole and less than an average molecular weight of the viscosifying agent, whereby the crosslinked synthetic polymer increases one or more fluid loss properties of the treatment fluid without increasing a viscosity of the treatment fluid, and
   introducing the treatment fluid into at least a portion of a well bore penetrating at least a portion of a subterranean formation.

2. The method of claim 1 wherein the crosslinking agent comprises at least one crosslinking agent selected from the group consisting of: a methylenebisacrylamide, a vinyl ether of a glycol, an allyl ether of a glycol, a vinyl ether of a polyol, an allyl ether of a polyol, and any combination thereof.

3. The method of claim 1 wherein the second monomer comprises at least one monomer selected from the group consisting of: N-vinylpyrrolidone, N-vinylcaprolactam, N-vinylformamide, N-vinyl-N-methylacetamide, and any combination thereof.

4. The method of claim 1 wherein the crosslinked synthetic polymer has an average molecular weight of from about 500,000 grams per mole to about 2,000,000 grams per mole.

5. The method of claim 1 wherein the crosslinked synthetic polymer comprises:
   an ethylene repeating unit comprising an —NR$^a$-C(O)-R$^b$ group, wherein R$^a$ and R$^b$ are each selected from the group consisting of: —H, a substituted ($C_1$-$C_{20}$)hydrocarbyl, and an unsubstituted ($C_1$-$C_{20}$) hydrocarbyl;
   an ethylene repeating unit comprising an —S(O)$_2$OR$^1$ group wherein R$^i$ is selected from the group consisting of: —H, and a counterion; and
   an ethylene repeating unit bonded to an —R$^2$—O—R$^2$—C(—R$^2$—OR$^3$)3 group, wherein each R$^2$ is a substituted or unsubstituted ($C_1$-$C_{10}$) hydrocarbylene, and each R$^3$ is selected from the group consisting of: —H and -(substituted or unsubstituted ($C_1$-$C_{10}$) hydrocarbylene)-M, wherein each M is an ethylene repeating unit of the same molecule of the crosslinked synthetic polymer or in another molecule of the crosslinked synthetic polymer.

6. The method of claim 1 wherein the viscosifying agent comprises one or more polymeric viscosifying agents.

7. The method of claim 1 wherein the viscosifying agent comprises at least one copolymer of at least a first monomer comprising 2-acrylamido-2-methylpropane sulfonic acid, and a second monomer comprising an N-vinyl amide.

8. The method of claim 1 wherein the crosslinked synthetic polymer is present in the treatment fluid in an amount of about 4 lbs / bbl.

9. The method of claim 1 wherein the treatment fluid comprises a drilling fluid, and the method further comprises using the drilling fluid to drill at least a portion of the well bore.

10. The method of claim 9 wherein the drilling fluid is introduced into the well bore through the interior of a drill string, at least a portion of which is disposed in a portion of the well bore, and through one or more orifices of a drill bit disposed on one end of the drill string.

11. A method comprising:
    providing a treatment fluid comprising an aqueous base fluid, a viscosifying agent, and a crosslinked synthetic polymer that comprises
       a copolymer of at least a first monomer comprising 2-acrylamido-2-methylpropane sulfonic acid or any salt thereof, and a second monomer comprising an N-vinyl amide, and
       at least one crosslinking agent,
       wherein the crosslinked synthetic polymer is synthesized by combining the first and second monomers and the crosslinking agent in the presence of a chain transfer agent and an average molecular weight of the crosslinked synthetic polymer is less than an average molecular weight of the viscosifying agent, whereby the crosslinked synthetic polymer increases one or more fluid loss properties of the treatment fluid without increasing a viscosity of the treatment fluid; and
    introducing the treatment fluid into at least a portion of a well bore penetrating at least a portion of a subterranean formation.

12. The method of claim 11 wherein the average molecular weight of the crosslinked synthetic polymer is less than about 3,000,000 grams per mole.

13. The method of claim 11 wherein the crosslinked synthetic polymer has an average molecular weight of from about 500,000 grams per mole to about 2,000,000 grams per mole.

14. The method of claim 11 wherein the crosslinked synthetic polymer is present in the treatment fluid in an amount of about 4 lbs/bbl.

15. A method comprising:
    providing a solution comprising
       a first monomer comprising 2-acrylamido-2-methylpropane sulfonic acid or any salt thereof,
       a second monomer comprising an N-vinyl amide,
       at least one crosslinking agent, and
       a chain transfer agent;
    allowing the first and second monomers and the crosslinking agent to polymerize to form a crosslinked synthetic polymer;
    combining the crosslinked synthetic polymer with an aqueous base fluid and a viscosifying agent to form a treatment fluid, wherein an average molecular weight of the crosslinked synthetic polymer is less than an average molecular weight of the viscosifying agent, whereby the crosslinked synthetic polymer increases one or more fluid loss properties of the treatment fluid without increasing a viscosity of the treatment fluid; and
    introducing the treatment fluid into at least a portion of a well bore penetrating at least a portion of a subterranean formation.

16. The method of claim 15 wherein the average molecular weight of the crosslinked synthetic polymer is less than about 3,000,000 grams per mole.

17. The method of claim 15 wherein the crosslinked synthetic polymer has an average molecular weight of from about 500,000 grams per mole to about 2,000,000 grams per mole.

18. The method of claim 15 wherein the crosslinked synthetic polymer is present in the treatment fluid in an amount of about 4 lbs/bbl.

19. The method of claim 15 wherein the chain transfer agent is present in the treatment fluid in an amount of from about 0.01% to about 1% by weight of the total weight of the first and second monomers.

\* \* \* \* \*